June 3, 1930.  C. A. BUTCHER  1,761,006
PROTECTIVE SYSTEM
Filed Jan. 16, 1926   2 Sheets-Sheet 1
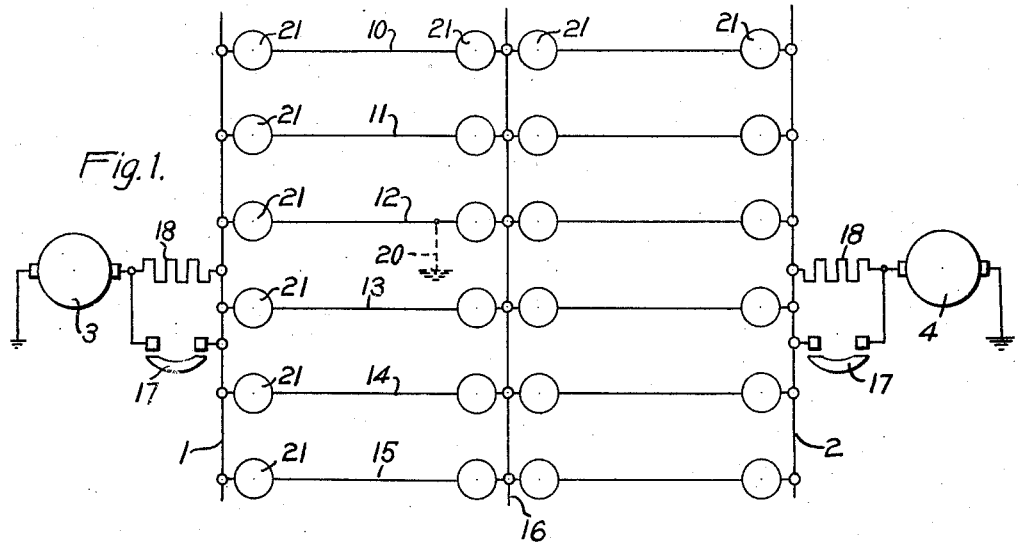
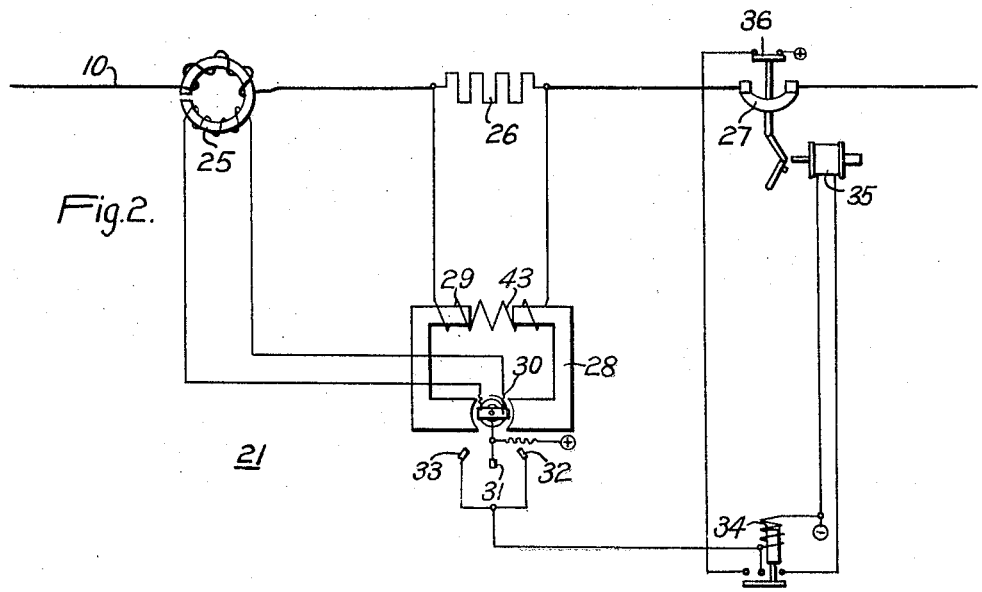
WITNESSES:
A. J. Schiefelbein
E. R. Evans
INVENTOR
Charles A. Butcher.
BY
Wesley G. Carr
ATTORNEY June 3, 1930.  C. A. BUTCHER  1,761,006
PROTECTIVE SYSTEM
Filed Jan. 16, 1926  2 Sheets-Sheet 2

WITNESSES:
A.J.Schiefelbein
E. R. Evans

INVENTOR
Charles A. Butcher.
BY Wesley G. Carr
ATTORNEY

Patented June 3, 1930

1,761,006

UNITED STATES PATENT OFFICE

CHARLES A. BUTCHER, OF EAST PITTSBURGH, PENNSYLVANIA, ASSIGNOR TO WESTINGHOUSE ELECTRIC & MANUFACTURING COMPANY, A CORPORATION OF PENNSYLVANIA

PROTECTIVE SYSTEM

Application filed January 16, 1926. Serial No. 81,858.

My invention relates to protective systems and particularly to protective systems for parallel transmission circuits.

An object of my invention is to provide an improved method of, and apparatus for, selectively disconnecting one of a plurality of parallel transmission circuits when a fault occurs thereon.

A further object of my invention is to provide means responsive to the rate of change of current and the magnitude of the current traversing a faulty circuit for isolating the circuit.

A further object of my invention is to provide in connection with a plurality of parallel direct-current transmission circuits, time-element protective means operating in accordance with the direction, the magnitude and the rate of change of current in the respective circuits upon the occurrence of a fault in the system.

In electrical distribution systems utilizing a plurality of parallel transmission circuits, the occurrence of a fault upon any circuit may cause an excessive current to traverse all of the circuits. It is, therefore, impracticable to select the faulty circuit with ordinary overcurrent relays or circuit-interrupters, although it is extremely desirable to disconnect only the faulty circuit and retain the remaining circuits in operative condition.

However, the current in the faulty circuit is larger than the currents in the remaining circuits and the rate of change of current in the faulty circuit upon the occurrence of the fault is greater than that of the remaining circuits. In accordance with my invention, means is provided that is responsive to the magnitude and the rate of change of the current in each circuit, said means being provided with damping or retarding means of such character that the circuit in which the magnitude and the rate of change of the current is greatest is disconnected more quickly than any of the other circuits. The disconnection of the faulty circuit relieves the excessive current upon the other circuits and consequently they are not disconnected.

For a clearer understanding of my invention, reference should be had to the accompanying drawings, in which Figure 1 is a diagrammatic view of a direct-current system to which the invention is applicable.

Figure 3:
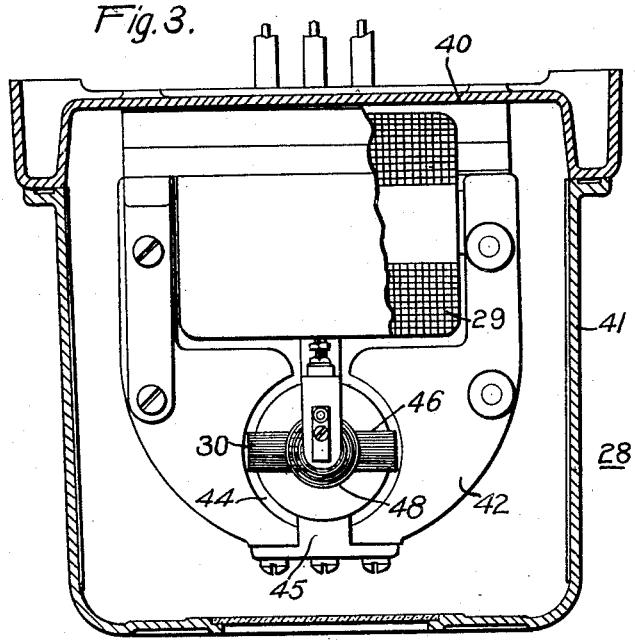
Figure 4:
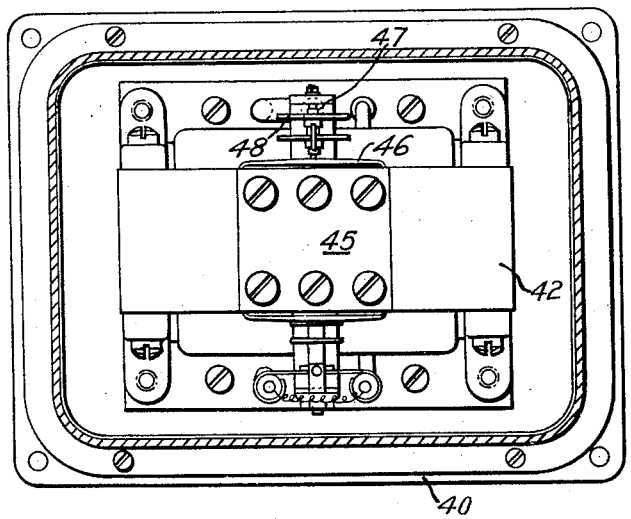
Figure 5:
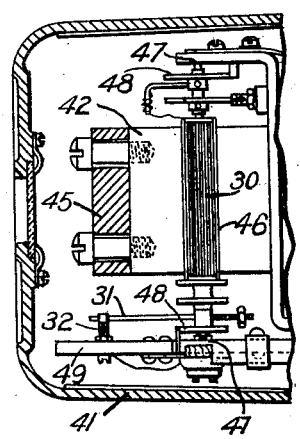

Fig. 2 is a diagrammatic view of one of the transmission circuits illustrated in Fig. 1 with my invention embodied therein, and Figs. 3 to 5 are detail views of the relay shown in Fig. 2.

A direct-current distribution system is shown in Fig. 1 which is similar to those employed for multiple-feeder railway distribution systems. The system comprises two supply busses 1 and 2 energized by the generators 3 and 4, respectively, a plurality of parallel-connected transmission circuits 10, 11, 12, 13, 14 and 15, and an equalizer or tie bus 16 at a point intermediate the supply busses 1 and 2. The load (not shown) is tapped on the transmission circuits 10—15 at any convenient points. Current-limiting means operated upon an excessive load-current, comprising a circuit-interrupter 17 and a resistor 18 in series with the generator and normally shunted by the interrupter may be provided if desired.

Upon the occurrence of a fault upon the system, as indicated at 20, an excessive current traverses the transmission circuits, the current in each circuit depending upon the resistance contained in the circuit between the fault and the generator or source of energy. Since the transmission circuit 12 offers the most direct path between the generators 3 and 4 and the fault, the magnitude of the current and the rate of change of the current at the instant the fault occurs is greater in this circuit than the corresponding values in the other parallel circuits. However, since the transmission circuits are usually comparatively short and consequently the difference in the resistances of the respective circuits is relatively small, all of the circuits may be traversed by an excessive current although of a somewhat smaller magnitude than that in the faulty circuit 12.

Protective means 21 embodying my invention are disposed at each end of the several transmission circuits 10 to 15 inclusive, the preferred arrangement of the protective means being shown in Fig. 2. A current transformer 25, a shunt 26 and a circuit-interrupter 27 are connected in series relation with the transmission circuit. A relay 28 is provided with a field winding 29 and a movable coil 30 cooperating therewith, said windings being connected respectively to the shunt 26 and the current transformer 25.

The relay 28 is provided with a moving contact member 31 adapted to cooperate with stationary contact members 32 and 33 to control the circuit of auxiliary relay 34, which in turn controls the trip coil 35 of the circuit-interrupter 27. If the relay 28 is operatively energized, a circuit is closed from battery through the contact member 31, the cooperating contact member 32 or 33 and the winding of the auxiliary relay 34, thereby energizing the auxiliary relay. Upon the energization of relay 34, a circuit is closed from battery through the trip coil 35, contact members of relay 34 and contact members 36 of a pallet switch on the circuit-interrupter 27, thus energizing the trip coil of the circuit-interrupter. The operation of relay 34 closes a locking circuit for the relay through its own contact members and the pallet switch 36, so that the relay is locked in its energized position until the circuit-interrupter 27 opens, irrespective of the operation of the relay 28.

The detailed construction of relay 28 is shown in Figs. 3 to 5 inclusive. The relay comprises a base member 40, a removable cover member 41 secured in any desired manner to the base member 40 and a relay element mounted on the base member 40.

The relay element, in its preferred form, embodies a stationary core member or field structure 42 on which the field winding 29 is disposed. The field structure may be provided with an air gap as indicated at 43 in Fig. 2. The forward end of the field structure 42 contains a circular air gap 44 in which the moving coil 30 is disposed. A non-magnetizable bracket 45 bridges the ends of the field structure and secures the same permanently in the desired relation. The movable winding 30 is supported by a metallic loop or frame member 46 (see Fig. 4) supported on the pivots 47 and controlled by retarding springs 48. The movable contact member 31 is secured to the lower end of the moving element 46, as shown in Fig. 5, and is adapted to cooperate with the stationary contact members 32 and 33 which are supported on an insulating member 49. The conducting frame member 46 may be made of aluminum or other light metal and forms a closed loop in the magnetic field of the instrument exerting a retarding effect upon the movements of the moving coil 30 in the well-known manner.

The turning torque of the moving coil 30 depends upon the current through the winding 30 and the magnetic flux traversing the winding. Since the field winding 29 is connected across a shunt 26 in the transmission circuit, the energization of the field winding and the strength of the magnetic field to which the moving coil is subjected are proportional to the current traversing the transmission circuit. On the other hand, the moving coil 30 is inductively related to the transmission circuit and consequently is energized in accordance with the rate of change of the current in the circuit. Since the movements of the moving coil are damped or retarded by the reaction of the currents induced in the frame member 46 by the magnetic field, the time of operation of the relay depends upon the magnitude of the current and the rate of change of the current in the associated circuit.

In case a fault occurs at the point indicated in Fig. 1, the relays 28 associated with the faulty transmission circuit 12 will be subjected to a greater short-circuit current and, at the instant of fault, to a greater rate of change of current than the relays associated with the parallel circuits. Consequently, the relays associated with the faulty circuit 12 will effect engagement of their contact members before any of the other relays complete their operation, thus disconnecting the faulty circuit. The disconnection of the faulty circuit causes the currents in the parallel circuits to be reduced and the moving coils 30 of the relays 28 associated with these circuits are subjected to a retarding torque in the opposite direction from the initial torque and positively preventing the disconnection of any of the remaining transmission circuits.

The current-limiting means 17 associated with each generator operates upon the occurrence of a severe fault in the system to prevent a flash-over on the commutator of the generator 3. This does not prevent the operation of the protective means 21, as the decrease in current in the respective transmission circuits resulting from the insertion of the resistor 18 in circuit merely produces a counter torque upon the relays 28 in the respective circuits thereby positively preventing the operation of the relays in the undamaged circuits and insuring that only the faulty circuit is disconnected.

It will be seen that by the use of the improved method and apparatus for selecting a faulty feeder which I have described, it is possible to prevent the disconnection of undamaged feeders and to maintain the entire portion of the system which is unaffected by a fault in service. Furthermore, after the faulty circuit has been disconnected, the reduction of current in the system causes a definite restraining torque to be applied to the control relays in the remaining circuits. The system which I have described is therefore much more positive and satisfactory in operation than those heretofore employed and may be used in transmission systems embodying a relatively large number of low-resistance circuits in parallel for which there has been no satisfactory means of protection.

Many changes in the construction of the apparatus which I have shown, in its application to various distribution systems, may be made without departing from the scope of my invention and consequently I do not desire to be limited in scope except as limitations are expressed in the appended claims.

I claim as my invention:

1. A protective system for a plurality of parallel-connected direct-current transmission circuits comprising inverse time-element relays associated with the ends of each of the respective circuits, means for energizing said relays in accordance with the magnitude and the rate of change of the current in the associated circuit, and means controlled by said relays for interrupting the current in a faulty circuit.

2. A protective system for a plurality of parallel-connected direct-current transmission circuits comprising inverse time-element relays associated with the respective circuits, means for energizing said relays in accordance with the current in the associated circuit and the rate of change of the current therein, and means controlled by said relays for isolating a faulty circuit.

3. A protective system for a direct-current transmission circuit comprising a current transformer and a shunt in series relation with said circuit, a relay having windings connected across said current transformer and shunt, said windings being relatively movable, and a circuit-interrupter in said circuit controlled by said relay.

4. A protective system for a direct-current transmission circuit comprising a relay having said windings in accordance with the current damping means therefor, means for energizing and windings in accordance with the current traversing said circuit and the rate of change of the current, respectively, and a circuit-interrupter controlled by said relay.

5. A protective system for a direct-current transmission circuit comprising a relay, a stationary polarized field winding for the relay, means for energizing said field winding in accordance with the current traversing said circuit, a movable winding for the relay cooperating with said stationary winding, damping means for said movable winding, means for energizing said movable winding in accordance with the direction of and rate of change of current in said circuit and means controlled by said relay for opening said circuit.

6. A protective system for a circuit including polarized time-element relays associated with the circuit, means for energizing said relays in accordance with the circuit current, said relays being operative after a time that depends upon the magnitude and the rate of change of the current in the circuit.

7. In a distribution system, a current-carrying conductor, a circuit breaker for interrupting the current in said conductor, relay means associated with said conductor and means for energizing said relay means in accordance with the magnitude, and the rate and duration of changes of the current in said conductor, for controlling the operation of said circuit breaker.

8. A protective system including a main conductor, a circuit breaker for interrupting the current in said conductor, relay means associated with said conductor and means for energizing said relay means in accordance with the magnitude of the current in said conductor, and the rate, duration and direction of changes in the value of said current for controlling the operation of said breaker.

9. The combination in a protective system for a transmission circuit having a circuit interrupter therein, of a ballistic relay associated with said circuit and means for energizing said relay in accordance with the rate, duration and direction of changes in the current in said circuit, for controlling the operation of said interrupter.

10. In a direct-current transmission circuit, a circuit breaker for interrupting the current in said circuit, ballistic means associated with said circuit and means for energizing said relay in accordance with the magnitude of said current and the rate, duration and direction of changes in said current for controlling said circuit breaker.

11. In combination, a transmission circuit, a circuit breaker for interrupting the current in said circuit, a relay associated with said circuit, and means for energizing said relay in accordance with the circuit current, said relay including a magnetic circuit excited in proportion to the current in said transmission circuit and a moving coil energized in response to the rate and duration of changes in said current, whereby the relay has an inverse time-delay characteristic such that the time delay is inversely proportional to the magnitude of said current and to the rate and duration of changes thereof, for controlling the said circuit breaker.

12. In a direct-current distribution circuit, protective apparatus including a d'Arsonval relay with a damped moving element for controlling current-interrupting means in the circuit, a device in said circuit for energizing said element in response to the rate of change of current in said circuit to produce a torque on said element resulting in a movement which is an integrated effect of the rate and duration of changes of current in said circuit.

13. A protective system for a distribution circuit including a relay associated with said circuit, means for energizing said relay in accordance with the circuit current, said relay having a fixed coil energized in proportion to the current flowing in the circuit to be protected and a cooperating moving coil energized in response to the rate and duration of changes of said current, so that the resultant movement of the moving coil of the relay depends upon both the magnitude of said current and the rate and duration of changes of said current.

14. A protective system for a distribution circuit including a relay having fixed and moving coils, the former being connected across a resistive shunt, which resistive shunt is connected in series with the circuit to be protected, and the latter being connected across the secondary winding of an impulse transformer of which the primary winding is connected in series with the circuit to be protected.

15. An electrical distribution system having a plurality of parallel-connected direct-current transmission circuits, protective relays associated with said circuits, means for energizing said relays in accordance with the transmission circuit currents, each of said relays comprising a fixed coil energized in proportion to the magnitude of the current in the circuits and a moving coil energized in response to the rate, duration and direction of changes in said current, said relays being operative to control circuit interrupters for isolating a faulty circuit in such a manner that, when a faulty circuit is isolated, the ensuing change from rising to falling current conditions in the remaining circuits prevents the switches therein from being operated, because of the reversal of the direction of torque on the relay moving coil.

16. An electrical distribution system having a plurality of parallel-connected direct-current transmission circuits, protective ballistic relays having an inverse time delay characteristic associated with said circuits, and means for energizing said relays in accordance with the circuit currents, each of said relays including a fixed magnetic circuit excited in proportion to the magnitude of the current in said circuits and a moving coil for cooperating with said magnetic circuit, energized in accordance with the rate, duration and direction of changes in said current, circuit interrupters for isolating said circuits, controlled by said relays, whereby when a faulty circuit is isolated, the movement of the moving coils of the relays in the other circuits is arrested and reversed as a result of the reversal of the direction of the change of current in said circuits.

17. A protective system for a distribution circuit including a relay associated with said circuit, means for energizing said relay in accordance with the circuit current, said relay having a movable, contact-making coil energized in accordance with the rate and duration of changes in the current in said circuit, and a fixed coil energized in proportion to the magnitude of said current, whereby said movable coil is subject to a directional torque, the direction depending on whether said current is increasing or decreasing.

In testimony whereof, I have hereunto subscribed by name this 19th day of December, 1925.

CHARLES A. BUTCHER.

CERTIFICATE OF CORRECTION.

Patent No. 1,761,006.  Granted June 3, 1930, to

CHARLES A. BUTCHER.

It is hereby certified that error appears in the printed specification of the above numbered patent requiring correction as follows: Page 3, lines 44 to 46, claim 4, strike out the words "said windings in accordance with the cur-damping means therefor, means for energizing and" and insert relatively movable co-operating windings, damping means therefor, means for energizing said; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.